United States Patent
Tsuchiya

(10) Patent No.: US 9,330,711 B2
(45) Date of Patent: May 3, 2016

(54) BEARING DEVICE

(71) Applicant: Minebea Co., Ltd., Kitasaku-gun, Nagano (JP)

(72) Inventor: Kunihiro Tsuchiya, Tomioka (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 0 days.

(21) Appl. No.: 14/465,245

(22) Filed: Aug. 21, 2014

(65) Prior Publication Data
US 2015/0055250 A1    Feb. 26, 2015

(30) Foreign Application Priority Data

Aug. 26, 2013  (JP) .................. 2013-174376
Jun. 27, 2014   (JP) .................. 2014-133033

(51) Int. Cl.
| | |
|---|---|
| G11B 19/20 | (2006.01) |
| G11B 33/14 | (2006.01) |
| F16C 33/80 | (2006.01) |
| F16C 35/077 | (2006.01) |
| G11B 5/55 | (2006.01) |
| F16C 33/78 | (2006.01) |
| F16C 19/54 | (2006.01) |

(52) U.S. Cl.
CPC .............. *G11B 19/20* (2013.01); *F16C 33/80* (2013.01); *F16C 33/805* (2013.01); *F16C 35/077* (2013.01); *G11B 5/5569* (2013.01); *G11B 33/1473* (2013.01); *F16C 19/54* (2013.01); *F16C 33/7846* (2013.01)

(58) Field of Classification Search
CPC ........................................................ F16C 33/00
USPC ......................................... 360/99.08; 384/41
See application file for complete search history.

(56) References Cited

U.S. PATENT DOCUMENTS

| | | | | |
|---|---|---|---|---|
| 5,596,235 A | * | 1/1997 | Yazaki et al. | 310/67 R |
| 5,768,051 A | * | 6/1998 | Kora et al. | 360/99.08 |
| 6,023,839 A | * | 2/2000 | Kinoshita et al. | 29/598 |
| 7,675,210 B2 | * | 3/2010 | Maekawa et al. | 310/90 |
| 8,807,836 B2 | * | 8/2014 | Kodama et al. | 384/107 |
| 2011/0249922 A1 | * | 10/2011 | Tsuchiya | 384/41 |
| 2013/0082554 A1 | * | 4/2013 | Yu | 310/90 |
| 2013/0136386 A1 | | 5/2013 | Tsuchiya | |

FOREIGN PATENT DOCUMENTS

| | | |
|---|---|---|
| JP | A-2008-069920 | 3/2008 |
| JP | A-2011-220427 | 11/2011 |

\* cited by examiner

*Primary Examiner* — Carlos E Garcia
(74) *Attorney, Agent, or Firm* — Oliff PLC

(57) ABSTRACT

In order to prevent leaking of lubricant, the bearing device includes a rolling bearing having an outer ring and an inner ring, a shaft fixed to the inner ring, and a sleeve fixed to the outer ring. A flange part is formed on at least one end part of the shaft. The flange part includes a disk part extending from the shaft toward an outside in a radial direction and a cylindrical part extending from the disk part along an axial direction. The cylindrical part is disposed at an outside of the outer ring, and a labyrinth gap which bends at two places is formed by gaps.

13 Claims, 4 Drawing Sheets

BEARING DEVICE

TECHNICAL FIELD

The present invention relates to a bearing device having a structure in which lubricant sealed in a rolling bearing can be prevented from leaking.

BACKGROUND ART

In recent years, hard disk drives have been required to have even greater storage capacity and faster operating speed. In this regard, it has become more important to maintain cleanliness within the hard disk drive. As a hard disk drive, a structure is known in which an actuator (arm) having a magnetic head at the tip thereof is rotatably supported by a pivot assembly bearing device (see Japanese Unexamined Patent Application Publication No. 2011-220427).

The pivot assembly bearing device includes a rolling bearing, and a lubricant is used in the rolling bearing. Here, there may be a case in which this lubricant causes a negative effect on the cleanliness of the internal space of the hard disk drive. To solve this problem, Japanese Unexamined Patent Application Publication No. 2008-69920 discloses a structure in which a flange is formed on a shaft, and a labyrinth seal to prevent leakage of lubricant is formed by a gap between an outer circumferential surface of this flange and housing.

The structure of the labyrinth seal in Japanese Unexamined Patent Application Publication No. 2008-69920 cannot sufficiently prevent the lubricant from leaking because the length of the gap extending along a leak path of the lubricant is short and the extending direction of the leak path is in only one direction. In view of such circumstances, an object of the present invention is to prevent the lubricant from leaking.

SUMMARY OF THE INVENTION

The first aspect of the invention is a bearing device including: a rolling bearing having an outer ring and an inner ring, a shaft fixed to the inner ring, and a sleeve fixed to the outer ring, wherein a flange is formed on at least one end part of the shaft, the flange includes a disk part extending from the shaft toward an outside in a radial direction and a cylindrical part extending from the disk part along an axial direction, the cylindrical part positions at the outside of the outer ring, a first gap is formed between the cylindrical part and the sleeve, a second gap is faced by the inner circumferential surface of the cylindrical part, and a third gap is formed between the outer ring and the disk part, and a labyrinth gap that bends at at least two positions is formed by the first, second, and third gaps.

According to the first aspect of the invention, a structure in which the lubricant is unlikely to leak can be obtained because part of the rolling bearing is contained in a concave part defined by the shaft, the disk part and the cylindrical part, and because a bent labyrinth gap is formed.

The second aspect of the invention is a bearing device in which the first gap includes a part extending along a direction perpendicular to the axis, the second gap extends along a direction parallel to the axis, and the third gap extends along a direction perpendicular to the axis, in the first aspect of the invention. According to the second aspect of the invention, the lubricant agent can be effectively prevented from leaking since the path of the gap is bent like a crank shape when viewed in cross section. It should be noted that the direction perpendicular to the axis means a direction perpendicular to the axial direction of the shaft, and the direction parallel to the axis means a direction parallel to the axial direction of the shaft.

The third aspect of the invention is a bearing device in which the second gap is formed between the inner circumferential surface of the cylindrical part and the outer ring, or between the inner circumferential surface of the cylindrical part and the outer circumferential surface of the sleeve, in the first or second aspect of the invention. According to the third aspect of the invention, a gap having a cross section like a crank shape can be effectively formed by the cylindrical part.

The fourth aspect of the invention is a bearing device in which the width of the first gap is not more than the width of the second gap and the third gap, in any one of the first to third aspects of the invention.

The fifth aspect of the invention is a bearing device, in which an extending part which faces the outer or inner circumferential surface of the cylindrical part is formed on the sleeve, a step part is formed in the sleeve as a result of which the extending part is formed, the first gap is formed between an end surface of the cylindrical part and the step part, and another gap is further formed between the outer circumferential surface of the cylindrical part and the inner circumferential surface of the extending part, or between the disk part and an end surface of the extending part, in any one of the first to fourth aspects of the invention. According to the fifth aspect of the invention, a further improved sealing performance can be obtained since another gap is further formed connecting to the first gap and the second gap.

The sixth aspect of the invention is a bearing device, in which the first gap includes a part perpendicular to the axis and a part parallel to the axis, and the width of the gap of the part perpendicular to the axis is larger than the width of the gap of the part parallel to the axis, in the first or second aspect of the invention. According to the sixth aspect of the invention, since the first gap bends so as to form the part perpendicular to the axis and the part parallel to the axis, superior sealing can be obtained. In addition, when a flange and a sleeve are assembled, the tolerance accumulation along the axial direction may be significant, and there is a possibility that preload cannot be appropriately applied because of contact between the flange end surface and the sleeve. However, this problem can be avoided by enlarging the width of the gap in the portion perpendicular to the axis (the gap having width in axial direction).

The seventh aspect of the invention is a bearing device, in which the width of the gap of the part parallel to the axis of the first gap is not more than the width of the second and third gaps, in the sixth aspect of the invention. According to the seventh aspect of the invention, since the width of the first gap of the part parallel to the axis which is at the most downstream side seen from the direction of leakage of the lubricant is not greater than the width of the second and the third gaps which are at more upstream side than the first gap, a high sealing performance can be obtained.

The eighth aspect of the invention is a bearing device, in which the flange and the shaft are formed as a one-piece body, in any one of the first to the seventh aspects. According to the eighth aspect of the invention, the number of parts can be reduced and dimensional accuracy of the first, second, and third gaps formed by the flange can be improved.

The ninth aspect of the invention is a bearing device, in which another flange having a similar structure of the flange and not formed in one piece with the shaft is arranged at another part of the shaft, in any one of the first to eighth aspects of the invention.

The tenth aspect of the invention is a bearing device, in which the another flange is fixed to the shaft by adhesive, interference fit, or welding, in a ninth aspect of the invention.

According to the present invention, a bearing device that can avoid leakage of the lubricant can be obtained.

DESCRIPTION OF THE PREFERRED EMBODIMENTS

1. First Embodiment

Figure 1:
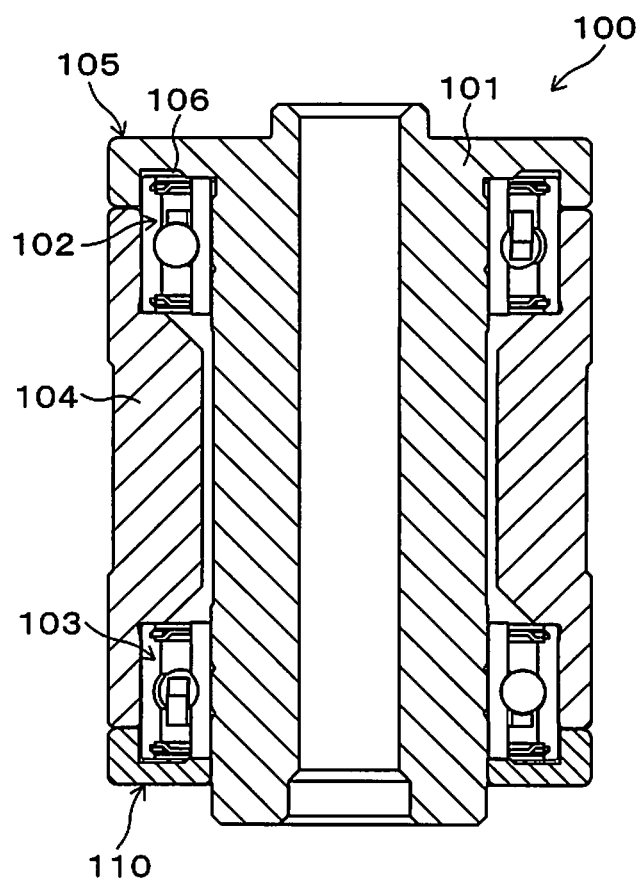
FIG. 1 is a cross sectional view of an Embodiment.

FIG. 1 shows a pivot assembly bearing device 100 of this Embodiment. The pivot assembly bearing device 100 includes a shaft 101 that corresponds to a rotation axis. An actuator (arm) (not shown) having a magnetic head at the tip thereof is fixed on an outer circumferential part of a sleeve 104, and the shaft 101 functions as a rotation axis of the actuator. The sleeve 104 is rotatably held by the shaft 101 via rolling bearings 102 and 103. The shaft 101 has an approximately cylindrical structure, and a lower support part of the structure is fixed on a base plate of a hard disk drive (not shown). By rotating the sleeve 104 around the shaft 101, the sleeve 104 and the actuator (not shown) are moved, thereby performing oscillation action of the magnetic head part on the tip of the actuator. It should be noted that the driving part for rotation of the sleeve 104 and for oscillation of the actuator is not shown.

Figure 2A:
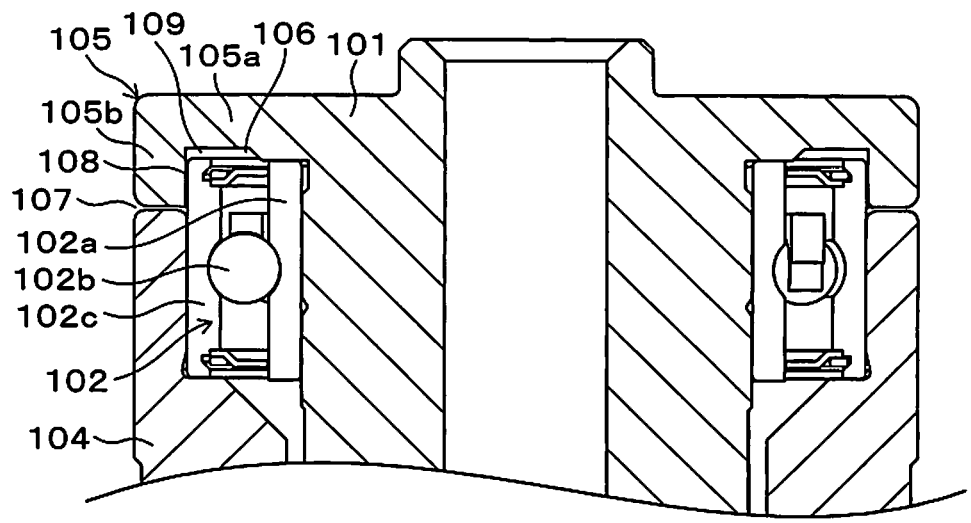
FIGS. 2A and 2B are a partially enlarged views of FIG. 1

Hereinafter the rolling bearing 102 and the surrounding structure thereof are explained. FIG. 2A shows an enlarged view of the vicinity of the rolling bearing 102 of FIG. 1. As shown in FIG. 2A, the rolling bearing 102 includes an inner ring 102a, rolling elements (ball) 102b and an outer ring 102c, and the rolling elements 102b are disposed between the inner ring 102a and the outer ring 102c. By rolling the rolling elements 102b, the outer ring 102c rotates relative to the inner ring 102a. For smooth rolling of rolling elements 102b relative to the inner ring 102a and the outer ring 102c, a lubricant (lubricating oil or the like) is coated on the part where the rolling elements 102b roll.

A flange part 105 is integrally formed on one end side (upper side in the figure) of the shaft 101. The flange part 105 includes a disk part 105a extending in a direction away from the axis, and a cylindrical part 105b extending from outer edge of the disk part 105a in the axial direction (lower direction in the figure) while covering the outside of the rolling bearing 102 (outside in the direction away from the axis). By the existence of the cylindrical part 105b, a concave part 106 that is concave in the axial direction is formed at the internal part of the cylindrical part 105b, and a part of the rolling bearing 102 is contained in the concave part 106.

The inner ring 102a of the rolling bearing 102 is fixed to the shaft 101. That is, the end surface of the inner ring 102a (upper end surface in the figure) is fixed to the inner side (lower surface in the figure) of the disk part 105a, and the inner circumferential surface of the inner ring 102a is fixed on the outer circumferential surface of the shaft 101. As the fixing method, a method using an adhesive, a method using interference fit, a method using welding such as laser welding or the like, and combinations thereof can be mentioned. This is also the same for the outer ring 102c and the rolling bearing 103.

The outer circumferential surface of the outer ring 102c of the rolling bearing 102 is fixed on an inner circumferential surface of the sleeve 104. The flange part 105 and the sleeve 104 do not contact each other, and a gap 107 is formed therebetween. The outer ring 102c and the inside of the cylindrical part 105b do not contact each other, and a gap 108 is formed therebetween. The disk part 105a and end surface (upper end surface in the figure) of the outer ring 102c do not contact each other, and a gap 109 is formed therebetween. The gap 107 is an example of the first gap, the gap 108 is an example of the second gap, and the gap 109 is an example of the third gap.

The gap 107 extends along a direction perpendicular to the axis (the direction away from the axis), the gap 108 extends along a direction parallel to the axis, and the gap 109 extends along a direction perpendicular to the axis. The widths of the gaps 107, 108, and 109 (gap size) are set at about 0.01 to 0.1 mm, for example. In order to obtain superior sealing performance, it is preferred that the width of the gap 107 (gap size) be not more than that of the other gaps.

Figure 2B:
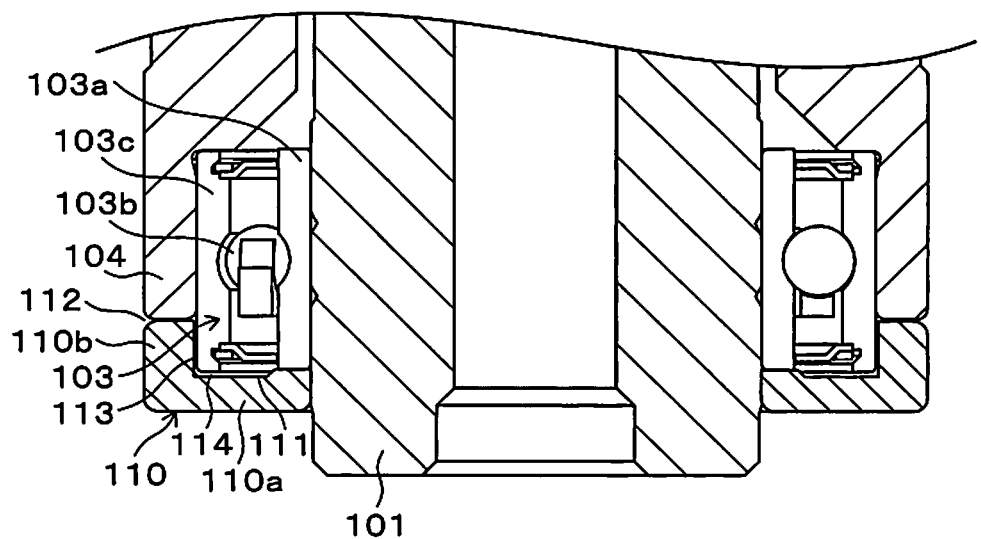

Next, the vicinity of the rolling bearing 103 is explained. FIG. 2B shows an enlarged view of the vicinity of the rolling bearing 103 of FIG. 1. As shown in FIG. 2B, the rolling bearing 103 includes an inner ring 103a, rolling elements (balls) 103b and an outer ring 103c. The rolling elements 103b are disposed between the inner ring 103a and the outer ring 103c. By rolling the rolling elements 103b, the outer ring 103c rotates relative to the inner ring 103a. For smooth rolling of rolling elements 103b relative to the inner ring 103a and the outer ring 103c, a lubricant (lubricating oil or the like) is coated on a part where the rolling elements 103b roll.

An external flange 110 (also called a hub cap) is attached to the other end side of the shaft 101 (lower end side in the figure). The external flange 110 is a member independent from the shaft 101, and it is fixed to the shaft 101 by a method using an adhesive, a method using interference fit, a method using welding such as laser welding or the like, or any of combinations thereof. The external flange 110 includes a disk part 110a extending in a direction perpendicular to the axis, and a cylindrical part 110b extending from an outer edge of the disk part 110a in the axial direction while covering the outside of the rolling bearing 103. By the existence of the cylindrical part 110b, a concave part 111, which is concave in the axial direction, is formed at an inner part of the cylindrical part 110b, and a part of the rolling bearing 103 is contained in the concave part 111.

The inner ring 103a of the rolling bearing 103 is fixed to the shaft 101. That is, an end surface (lower end surface in the figure) of the inner ring 103a is fixed to an inside (upper surface in the figure) of the disk part 110a, and an inner circumferential surface of the inner ring 103a is fixed to an outer circumferential surface of the shaft 101.

Furthermore, the outer ring 103c of the rolling bearing 103 is fixed to an inner circumferential surface of the sleeve 104. The external flange 110 and the sleeve 104 do not contact each other, and a gap 112 is formed therebetween. The inside of the cylindrical part 110b of the external flange 110 and the outer ring 103c do not contact each other, and a gap 113 is formed therebetween. The disk part 110a of the external flange 110 and edge surface of the outer ring 103c do not contact each other, and a gap 114 is formed therebetween. Gap sizes of the gaps 112, 113, and 114 are set to about 0.01 to 0.1 mm, for example. In order to obtain superior sealing performance, it is preferred that the width of the gap 112 (gap size) be not more than that of the other gaps.

Action and Effects

A labyrinth gap is formed by the gaps 107, 108, and 109, thereby preventing the lubricant sealed in the vicinity of the rolling elements 102b from leaking to the outside of the bearing device. In addition, a labyrinth gap is formed by the gaps 112, 113, and 114, thereby preventing the lubricant sealed in the vicinity of the rolling elements 103b from leaking to the outside of the bearing device. The labyrinth gaps have a cross section like a crank shape which bends at two places, thereby making the leaking path of the lubricant a longer bent structure. Therefore, a sealing structure, from which lubricant is unlikely to leak, can be obtained. In particular, since the gap 108 extending along an axial direction is formed between the gaps 107 and 109 extending in a radial direction (direction perpendicular to the axis), leakage of lubricant due to centrifugal force can be effectively restrained. Similarly, since the gap 113 extending in an axial direction is formed between the gaps 112 and 114 extending in a radial direction, leakage of lubricant due to centrifugal force can be effectively restrained. Furthermore, since the flange part 105 and the shaft 101 are formed integrally as one-piece body, the number of parts can be reduced, and accuracy of gap size can be maintained.

Furthermore, a part of the outer ring 102c is covered from the outside radial direction by the cylindrical part 105b, and an end part in the axial direction of the rolling bearing 102 is covered by the disk part 105a, thereby efficiently preventing lubricant from leaking from the retaining the rolling elements 102b. Similarly, a part of the outer ring 103c is covered from the outside by the cylindrical part 110b, and an end part in the axial direction of the rolling bearing 103 is covered by the disk part 110a, thereby efficiently preventing lubricant from leaking from the part retaining the rolling elements 103b.

2. Second Embodiment

Figure 3:
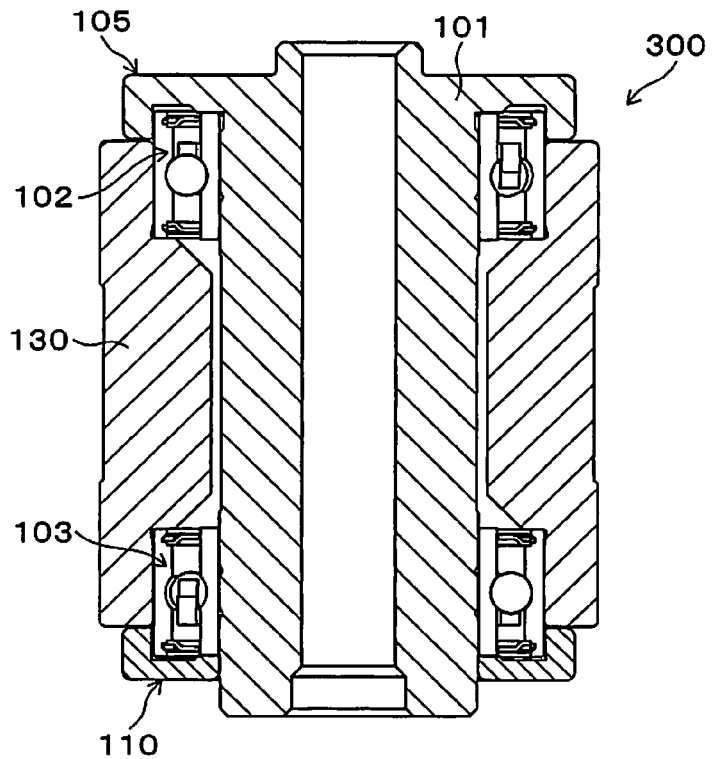
FIG. 3 is a cross sectional view of another Embodiment.

FIG. 3 shows a pivot assembly bearing device 300 in which a sleeve 130 having a larger outer diameter is employed instead of the sleeve 104 in the structure shown in FIG. 1. An actuator (arm) (not shown) having a magnetic head at the tip thereof is fixed to the outside of the sleeve 130. It should be noted that the parts other than the sleeve 130 are similar to the pivot assembly bearing device 100.

3. Third Embodiment

Figure 4:
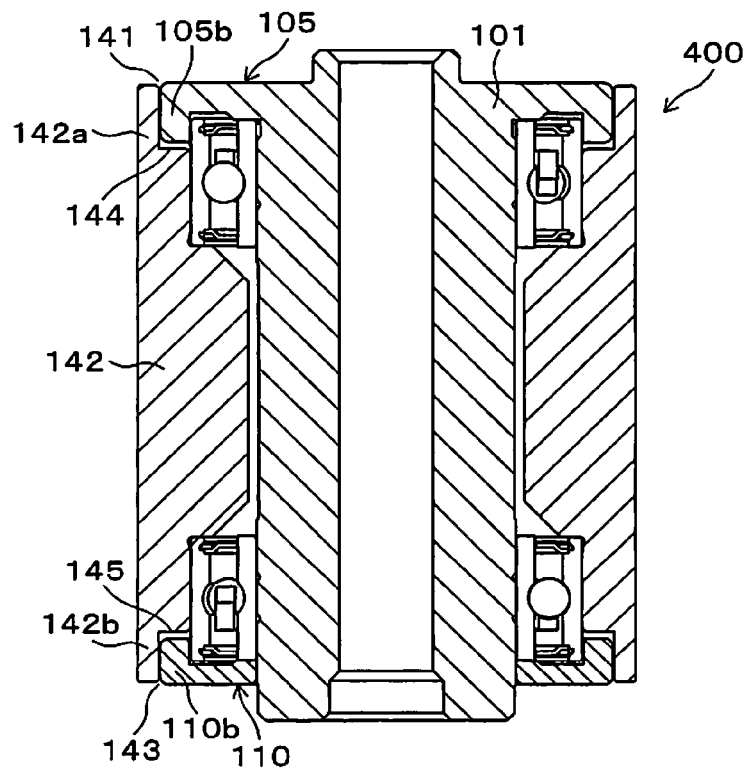
FIG. 4 is a cross sectional view of another Embodiment

FIG. 4 shows a pivot assembly bearing device 400. In the pivot assembly bearing device 400, the sleeve is extended in the axial direction so as to cover the outside of the cylindrical part 105b of the flange 105 in the structure of FIG. 1, thereby forming a gap 141, in addition to the labyrinth gap in the FIG. 1. That is, the pivot assembly bearing device 400 includes a sleeve 142 having extending parts 142a and 142b which extend along the axial direction and surround the outside of the cylindrical parts 105b and 110b. The inner diameter of the extending part 142a is enlarged so that the cylindrical part 105b is contained therein. In addition, the extending part 142b has a structure similar to the extending part 142a. A gap 141 is formed between an inner circumferential surface of the extending part 142a and an outer circumferential surface of the cylindrical part 105b, and a gap 143 is formed between the extending part 142b and the cylindrical part 110b.

Furthermore, a gap 144 corresponding to the gap 107 in FIG. 2A is formed between an end surface (step surface) in the axial direction of the part inside the extending part 142a where the diameter is enlarged and an end surface in the axial direction of the cylindrical part 105b. Similarly, a gap 145 corresponding to the gap 112 in FIG. 2B is formed between an end surface (step surface) in the axial direction of the part inside the extending part 142a where the diameter is enlarged and an end surface in the axial direction of the cylindrical part 110b. The gaps 141 and 143 correspond to the further another gap in the present invention. The other parts of the pivot assembly bearing device 400 are the same as in the structure of FIG. 1.

According to the structure shown in FIG. 4, since the labyrinth gap is further bent and is longer compared to the structure shown in FIG. 1, the effect to prevent leaking of lubricant is improved. Therefore, leaking of lubricant sealed in the vicinity of the rolling elements 102b and 103b to the outside of the pivot assembly bearing device 400 is efficiently prevented.

Furthermore, in the structure shown in FIG. 4, it is desirable that width of the gaps 144 and 145 be larger than that of the gaps 141 and 143. When the flange and the sleeve are assembled, the accumulated tolerance along the axial direction may be large and there is a possibility that preload cannot be appropriately applied because of contact between the flange end surface and the sleeve in the gaps 144 and 145. However, by enlarging the gaps 144 and 145 (gap along axial direction), the above problem can be avoided.

In this case, it is also desirable that the widths of the gaps 141 and 143 be not greater than the widths of the gaps in FIG. 4 corresponding to the gaps 108, 109, 113 and 114 in FIGS. 2A and 2B. According to this aspect, a superior sealing performance can be obtained in view of the leaking direction of the lubricant, because the widths of the gaps 141 and 143 located at downstream side of the leaking direction are not greater than the widths of the gaps at the upstream side.

4. Fourth Embodiment

Figure 5:
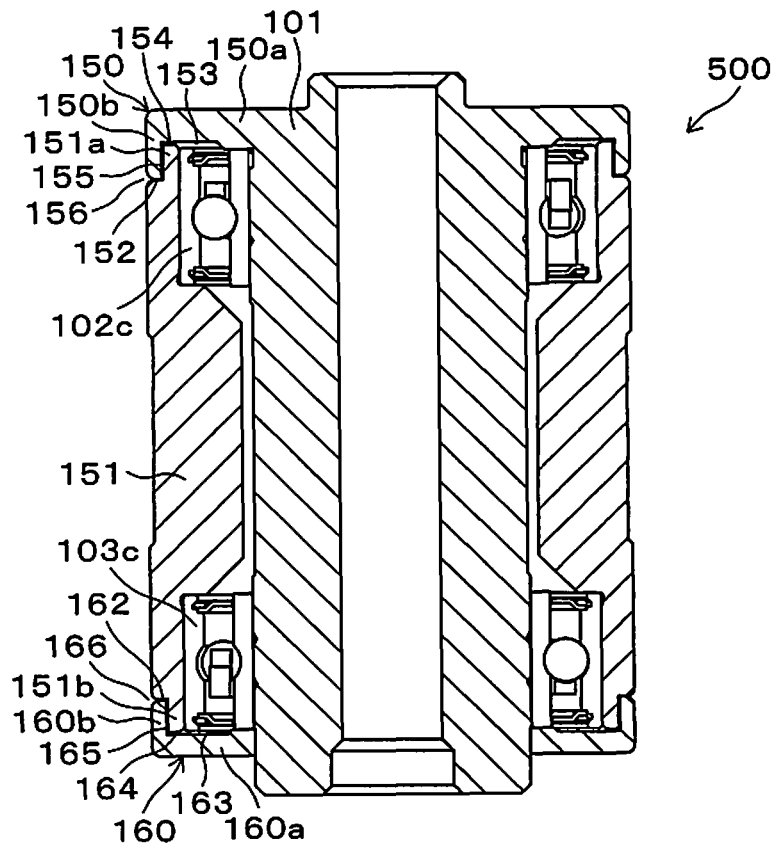
FIG. 5 is a cross sectional view of another Embodiment

FIG. 5 shows a pivot assembly bearing device 500. It should be noted that the parts similar to those of the pivot assembly bearing device 100 shown in FIG. 1 are not explained in detail. The pivot assembly bearing device 500 includes a flange part 150. The flange part 150 is formed integrally with the shaft 101, and includes a disk part 150a and a cylindrical part 150b. A sleeve 151 includes extending parts 151a and 151b extending along the axial direction. Outer diameters of the extending parts 151a and 151b are reduced, and the cylindrical part 150b and the below-mentioned cylindrical part 160b are positioned at this reduced part.

A gap 153 is formed between the cylindrical part 150a and the outer ring 102c, a gap 154 is formed between the disk part 150a and an end part of the extend part 151a, and a gap 155 is formed between an outer circumferential surface of the extend part 151a and an inner circumferential surface of the cylindrical part 150b. Also, a gap 156 is formed between a step part 152 provided in the outer circumference of the sleeve 151 at the root part of the extending part 151a and the end surface along the axial direction of the cylindrical part 150b. A labyrinth gap is defined by the gaps 153, 154, 155 and 156. Here, the gap 156 corresponds to the first gap, the gap 155 corresponds to the second gap, and the gap 153 corresponds to the third gap. Furthermore, the gap 154 corresponds to the another gap.

The pivot assembly bearing device 500 includes an external flange 160. The external flange 160 is attached to the shaft 101, and includes a disk part 160a and a cylindrical part 160b. A gap 163 is formed between the disk part 160a and the outer ring 103c, a gap 164 is formed between the disk part 150a and the end part of the extending part 151b, and a gap 165 is formed between the extending part 151b and the cylindrical part 160b. Also, a gap 166 is formed between a step part 162 provided in the outer circumference of the sleeve 151 at the root part of the extending part 151b and the end surface of the cylindrical part 160b. A labyrinth gap is defined by these gaps 163, 164, 165, and 166.

5. Fifth Embodiment

Figure 6:
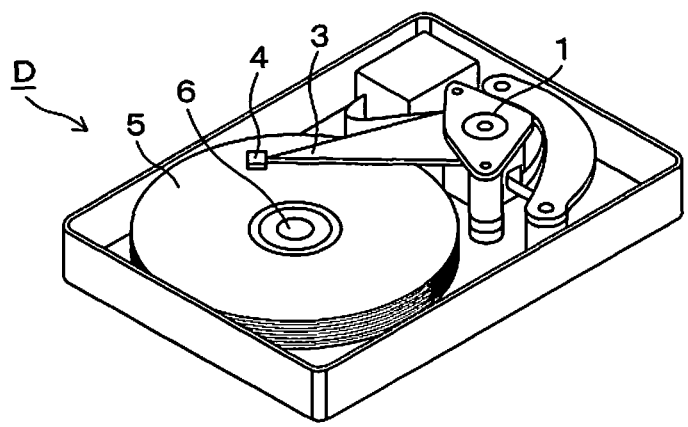
FIG. 6 is a perspective view of another Embodiment

FIG. 6 shows a hard disk drive D in which the bearing device according to the present invention is used. The hard disk drive D has a structure in which an actuator (arm) 3 is rotatably supported by a pivot assembly bearing device 1 according to the present invention. As the pivot assembly bearing device 1, any one of the first to fourth Embodiments can be employed but it is not limited to only those Embodiments. A magnetic head 4 is attached the tip of the actuator 3, and data is written and read with respect to a rotating magnetic disk 5 via the magnetic head 4.

Other Matters

The present invention is not limited only to the Embodiments mentioned above. The present invention includes variations that can be conceived by those skilled in the art, and effects of the invention are also not limited to the above-mentioned. Various additions, variations, and partial deletions are possible as long as they do not deviate from the concept and purposes of the invention as claimed and their equivalents. For example, the case in which the invention is applied to the pivot assembly bearing device used in a hard disk drive is explained in this specification. However, the use of the present invention is not limited to the pivot assembly bearing device, and it can be used in a bearing device having different purposes. Furthermore, the Embodiments are explained based on the examples having two rolling bearings; however, the number of the rolling bearing is not limited to two. Furthermore, the present invention includes a bearing device with at least one rolling bearing provided with a sealing structure according to the invention.

EXAMPLES

The comparison between an embodiment of the present invention and a comparative example is explained in detail as follows.

1) Comparison Test

The pivot assembly bearing device of the third Embodiment shown in FIG. 4 as the Example and a conventional pivot assembly bearing device having a flange part without the cylindrical part as the Comparative Example (a pivot assembly bearing device without a bent labyrinth gap) were prepared, and comparison tests were performed regarding the amounts of particles produced. The size of the bearing used was outer diameter 9.5 mm, inner diameter 6.4 mm, and width 3.2 mm. The minimum width size of the gap between the sleeve and the flange was set to 0.13 mm in both Examples.

2) Measurement Condition

In a space which particles cannot leak to the outside, the pivot assembly bearing device was oscillated 30 degrees right and 30 degrees left at high speed while air was forced to flow. Then, the amount of particles in the air was measured.

3) Test Result

As a result of the test, in the pivot assembly bearing device of the Comparative Example having a conventional flange part, the amount of particles produced was 1.293 $\mu m^3$/min; on the other hand, in the pivot assembly bearing device of Example according to the third Embodiment (FIG. 4), the amount of particles was 0.634 $\mu m^3$/min, which is about half of the Comparative Example. By using the pivot assembly bearing device according to an Embodiment of the present invention, it was confirmed that lubricant is sealed by the labyrinth gap and that the amount of particles generated can be reduced.

The present invention can be used in a bearing device.

What is claimed is:

1. A bearing device comprising:
a rolling bearing having an outer ring and an inner ring;
a shaft fixed to the inner ring;
a sleeve fixed to the outer ring;
a flange formed on at least one end part of the shaft, the flange comprising:
   a disk part extending from the shaft toward an outside in a radial direction; and
   a cylindrical part disposed at an outside of the outer ring and extending from the disk part along a direction of an axis;
an extending part formed on the sleeve that faces an outer or inner circumferential surface of the cylindrical part;
a step part formed in the sleeve as a result of the extending part being formed;
a labyrinth gap that bends in at least two places, the labyrinth gap being formed by:
   a first gap formed between an end surface of the cylindrical part and the step part;
   a second gap faced by the inner circumferential surface of the cylindrical part; and
   a third gap formed between the outer ring and the disk part; and
another gap further formed between the outer circumferential surface of the cylindrical part and an inner circumferential surface of the extending part, or between the disk part and an end surface of the extending part.

2. A hard disk drive comprising a bearing device according to claim 1 which rotatably supports an arm with a magnetic head.

3. The bearing device according to claim 1, wherein the flange and the shaft are formed as a one-piece body.

4. A hard disk drive comprising a bearing device according to claim 3 which rotatably supports an arm with a magnetic head.

5. The bearing device according to claim 1, wherein another flange having a similar structure to the flange and not formed in one piece with the shaft is arranged at another part of the shaft.

6. A hard disk drive comprising a bearing device according to claim 5 which rotatably supports an arm with a magnetic head.

7. A bearing device comprising:
a rolling bearing having an outer ring and an inner ring;
a shaft fixed to the inner ring;
a sleeve fixed to the outer ring;
a flange formed on at least one end part of the shaft, the flange comprising:
   a disk part extending from the shaft toward an outside in a radial direction; and
   a cylindrical part disposed at an outside of the outer ring and extending from the disk part along a direction of an axis; and
a labyrinth gap that bends in at least two places, the labyrinth gap being formed by:
   a first gap formed between the cylindrical part and the sleeve, the first gap including a part perpendicular to the axis and a part parallel to the axis, a width of the part of the first gap perpendicular to the axis being greater than a width of the part of the first gap parallel to the axis;
   a second gap faced by an inner circumferential surface of the cylindrical part; and
   a third gap formed between the outer ring and the disk part.

8. The bearing device according to claim 7, wherein the width of the part of the first gap parallel to the axis is not greater than a width of the second gap or a width of the third gap.

9. A hard disk drive comprising a bearing device according to claim 7 which rotatably supports an arm with a magnetic head.

10. The bearing device according to claim 7, wherein the flange and the shaft are formed as a one-piece body.

11. The bearing device according to claim 7, wherein another flange having a similar structure to the flange and not formed in one piece with the shaft is arranged at another part of the shaft.

12. A bearing comprising:
 a rolling bearing having an outer ring and an inner ring;
 a shaft fixed to the inner ring;
 a sleeve fixed to the outer ring;
 a first flange formed on at least one end part of the shaft, the first flange comprising:
  a disk part extending from the shaft toward an outside in a radial direction; and
  a cylindrical part disposed radially outside of the outer ring and extending from the disk part along a direction of an axis;
 a second flange arranged at another part of the shaft, the second flange having a similar structure to the first flange and being not formed in one piece with the shaft; and
 a labyrinth gap that bends in at least two places, the labyrinth gap being formed by:
  a first gap formed between the cylindrical part and the sleeve;
  a second gap faced by an inner circumferential surface of the cylindrical part; and
  a third gap formed between the outer ring and the disk part.

13. The bearing device according to claim 12, wherein the second flange is fixed to the shaft by adhesive, interference fit, or welding.

* * * * *